United States Patent [19]
De Vos et al.

[11] Patent Number: 5,819,219
[45] Date of Patent: Oct. 6, 1998

[54] DIGITAL SIGNAL PROCESSOR ARRANGEMENT AND METHOD FOR COMPARING FEATURE VECTORS

[75] Inventors: Luc De Vos; Daniel Goryn, both of Munich, Germany

[73] Assignee: Siemens Aktiengesellschaft, Munich, Germany

[21] Appl. No.: 763,816

[22] Filed: Dec. 11, 1996

[30] Foreign Application Priority Data

Dec. 11, 1995 [DE] Germany ............... 195 46 168.1

[51] Int. Cl.$^6$ ................................. G10L 1/00
[52] U.S. Cl. ............... 704/238; 704/227; 704/239; 704/250; 704/251
[58] Field of Search ................... 704/227, 238, 704/247, 231, 239, 240, 250, 251

[56] References Cited

U.S. PATENT DOCUMENTS

| | | | |
|---|---|---|---|
| 4,592,086 | 5/1986 | Watari | 381/42 |
| 4,849,706 | 7/1989 | Davis et al. | 329/112 |
| 4,991,170 | 2/1991 | Kem | 370/85.1 |
| 5,159,637 | 10/1992 | Okazaki et al. | 381/43 |
| 5,161,204 | 11/1992 | Hutcheson | 382/16 |
| 5,189,727 | 2/1993 | Guerreri | 704/231 |
| 5,197,140 | 3/1993 | Balmer | 395/400 |
| 5,206,940 | 4/1993 | Murakami | 395/400 |
| 5,299,320 | 3/1994 | Aono et al. | 395/375 |
| 5,592,403 | 1/1997 | Trager et al. | 364/724.01 |

FOREIGN PATENT DOCUMENTS 43 24 678  9/1994  Germany .

OTHER PUBLICATIONS

T. Tsuda et al., "Digital Signal Processor", Fujitsu Sci. Tech. J., 25, pp. 171–193, Sep. 1989.

Primary Examiner—David R. Hudspeth
Assistant Examiner—Daniel Abebe
Attorney, Agent, or Firm—Hill & Simpson

[57] ABSTRACT

A digital signal processor employable for utilization for speech processing or for some other pattern recognition overcomes the weaknesses of digital signal processors given the subtraction with following amount formation that must often be implemented in these applications, an auxiliary hardware is provided that contains the feature vector that is to be compared to reference feature vectors from the dictionary in a separate memory. The calculating work is thereby implemented by a separate arithmetic unit that provides a separate difference-forming and amount-forming unit for each feature comparison. The number of clock cycles of the digital signal processor required per comparison can be dramatically reduced by the invention. A suitable addressing method thereby assures that it is always corresponding features of the individual feature vectors that can be compared to one another.

8 Claims, 1 Drawing Sheet

DIGITAL SIGNAL PROCESSOR ARRANGEMENT AND METHOD FOR COMPARING FEATURE VECTORS

BACKGROUND OF THE INVENTION

1. Field of the Invention

The present invention relates generally to a digital signal processor and method, and in particular to an arrangement and method for comparing feature vectors to reference feature vectors.

2. Description of the Related Art

In specialized applications using processors, a type of processor referred to as digital signal processors are often utilized for complex and calculation-intensive signal processing problems. Depending on the calculating operations to be undertaken, various types of digital signal processors (DSP) are available for the respective application. One type of processor class is distinguished by the capability of performing fast processing of addition calculations due to its built-in adders, whereas, however, multiplication operations require a number of shift register operations in such a processor and, thus, last a number of processor clock cycles. Another type of processor class is accumulator/multiplier based and can implement multiplication calculations very efficiently, whereas, however, formation of a sum via operators in the processor cannot be implemented any faster than a multiplication operation.

In order to implement a large number of addition tasks and multiplication tasks in the implementation of signal processing algorithms, the circuit designer is confronted by a special problem. Such a performance problem arises, for example, when a task is configured such that a feature vector that was generated from a currently available signal must be compared within a predetermined time frame to all reference features of a reference feature vector in the processor memory. Depending on the memory word width, on the data bus width and the memory depth, a problem can arise in that all features that are deposited in the data memory of the digital signal processor cannot be compared to an incoming measured signal since the time conditions of the underlying application can then no longer be met.

If one wishes to make digital signal processors usable for widespread employment in speech recognition systems, then various versions, or approaches, are available for solving this problem.

In feature analysis of speech signals, a feature vector that, for example, is composed of k bytes is first extracted from the spoken voice signal during a time frame. This feature vector is subsequently referred to as a test feature vector. Subsequently, this feature vector must be compared to the required vocabulary, i.e. the phoneme segments belonging to the vocabulary that, for example, are likewise deposited as feature vectors in the memory of the digital signal processor. What are referred to as emission probabilities are defined for the extent of the coincidence of the feature vectors. To this end, for example, so-called city block spacing between the test feature vector and all phoneme segment feature vectors is determined, these being referred to subsequently as reference feature vectors. The smallest city block spacing is then the criterion for the coincidence between the test feature vector and the phoneme segment under consideration.

Based on this calculated emission probability, a finding, for example, of which word of the underlying dictionary was recognized is made in the third part of the speech recognition system. For example, the word width of the address bus determines the maximum size N of internal memory of the DSP. Given a memory word width of n bytes, thus, N×n bytes can be deposited in this memory. The upper limit for the number of reference feature vectors to be stored can thus be calculated as N×n/k.

Among other things, the city block spacing between the test feature vector and all reference feature vectors must then be calculated in a time span that corresponds to a sampled signal frame, which is typically 10 ms. This problem is extremely calculation-intensive because of the great number of reference feature vectors which can amount, for example, to between 1,000 and 20,000 per application. Just as in speech processing, such pattern recognition problems also arise in image signal processing or in operations involving time-variant measured signals in general. The problems discussed here thus also apply to these situations.

The first approach for solving this calculating problem is that the differences are determined on the basis of a difference calculation and then are followed by an accumulation step. As a rule, however, DSPs are not designed for the efficient calculation of sums of difference amounts. Further, additional clock cycles for the selective readout of the individual bytes of the memory words are required for these calculations. Overall, at least 5 system clock cycles can be assumed as required for an operation $D=D+|a-b|$. As a result thereof, the maximum number of reference feature vectors that can be handled by the DSP can become inadequate for a given recognition rate. D thereby references the city block spacing and a references a feature a, for example in the form of a byte, and b references a feature b, for example in the form of a byte.

A second approach is relocating the complicated calculations to external hardware, for example, to a customized circuit. Arbitrary acceleration factors can be fundamentally realized by parallelization using a calculation with customized components. At the same time, however, correspondingly more stringent demands are made of the data communication. What is true in this instance that the required memory bandwidth increases as the off-chip calculating throughput increases. As a result thereof, the hardware and interface costs rise perceptibly, which would have a negative influence on the ultimate sales price when such devices are put into mass production.

SUMMARY OF THE INVENTION

An object underlying the present invention is to provide a method and an arrangement with which the performance capability of a digital signal processor can be enhanced in the comparison of feature vectors without requiring the creation of technologically complicated and expensive auxiliary devices.

For the digital signal processor arrangement, this and other objects are achieved by a digital signal processor arrangement for comparing feature vectors, wherein a) at least one accumulator/multiplier-based signal processor computer core is provided for calculating a test feature vector;

b) at least one data memory with a first data memory word width is provided for accepting reference feature vectors;

c) at least one connection bus is provided for the transmission of data and/or addresses at least between circuit elements of the arrangement, the connection bus being such that a first data word width and a second address width can be transmitted;

d) at least one test memory with a second data memory word width is provided for the acceptance of the test feature vector;

e) at least one calculating means is provided for the comparison, the calculating means comparing the test feature vector to exactly one reference feature vector per comparison event by forming the amount of the difference between corresponding features of the test feature vector and corresponding features of the reference feature vector and summing up the difference amount for the respective comparison event;

f) the data memory, the test memory and the calculating means are connected to the signal processor computer core via the connection bus, and the data memory as well as the test memory are connected to the calculating means.

The present method for operating the digital signal processor arrangement provides a solution to the problem wherein a) the signal processor computer core first generates a single address with which at least one first feature of the test feature vector and a first, corresponding feature of the reference feature vector is addressed;

b) the individual bits of the respective features are simultaneously compared;

c) the comparison result is made available at the connection bus, so that it appears to the signal processor computer core as though it had called a data word stored in the data memory; and d) depending on the first and second data memory word width, new addresses are generated until the features of the test feature vector and of the reference feature vector have been completely compared to one another, whereby, following these steps, the address of a first feature of a further reference feature vector and of the first feature of the test feature vector is generated.

Developments of the invention provide that the arrangement as set out above has a separate address bus and separate data bus as a connection bus, whereby the address bus connects at least the data memory as well as the test memory to the signal processor computer core, and the data bus connects at least the test memory to the signal processor computer core and to the calculating means.

The arrangement may provide that the width of the first and the second data memory word are the same. The processor arrangement can be used when a feature being compared is the size of a data memory word.

An additional development of the arrangement has an address generator between the test memory and the computer core, the address generator determining a test memory address from a data memory address that is present on the data bus depending on the arrangement of the reference feature vectors in the data memory and depending on the arrangement of the features of the test feature vector in the test memory, the test address memory is determined such that corresponding features are compared to one another.

The arrangement of the present invention is particularly applicable for comparing features of voice signals.

For the method of the present invention, the steps include:

a) the first and the second data memory word widths are selected to be the same and to correspond to a whole multiple of the data word width of the transmission bus;

b) the data memory word width is a whole multiple of the bit number of a feature;

c) the features of the reference feature vectors are successively deposited in the data memory sorted according to successive addresses with an identical sequence of their individual features;

d) the test feature vector is deposited in the test memory sorted according to the successive addresses with the same sequence of its individual features as in the case of the reference feature vectors; and e) only the number of least significant bits of the data memory address corresponding to the data word width are supplied to the test memory for addressing the features.

A particular advantage of the inventive arrangement is that it makes a calculation result transparently available for the digital signal processor, to which end, however, it need only generate one memory address. Dependent on the data bus width and the memory word width, a plurality of features of a test feature vector can thus be compared during one processor clock cycle. The underlying hardware structure of the processor which are in the form of data busses is thereby optimally utilized. The address is generated at the address bus, and the calculation result is available, for example, either immediately or one or more clock cycles after the generation of the address at the data bus. For the processor, thus, it seems that the calculation result that is made available at the data bus had been stored in the memory of the processor.

A separate data bus and address bus can be advantageously provided in the inventive arrangement, i.e. a multiplexing event need not occur. The calculating throughput can thus be further enhanced for especially calculation-intensive applications.

Advantageously, the memory word width of the test memory and of the data memory are selected to be the same since, given a suitable arrangement of the features in the test memory and in the data memory, the address generated by the processor for the data memory can then also be used for addressing the test memory in that only the least significant bit of this address is forwarded to the test memory for the addressing thereof.

Especially advantageously, the individual feature vectors are described in multiples of the memory word width in the inventive method since the addressing of the individual features can be simplified further in this way.

An embodiment of the inventive arrangement advantageously provides a version for that instance wherein the bit-by-bit presentation of the features of the feature vector differs in size from a multiple of the memory word width. By simple address conversion proceeding from the address generated by the computer core, the features in the test memory can nonetheless be cyclically addressed in this case, namely from the first to the last and then beginning again at the first, whereas this address can be accepted unmodified for the features of the reference feature vectors present in the data memory.

Especially advantageously, features of speech signals can be compared using the inventive arrangement since these are customarily analyzed and presented in the form of feature vectors.

The features of the test feature vector and the respective features of a single reference feature vector are advantageously addressed with the operating method for the inventive arrangement such that they can be compared feature-by-feature, in pairs or in a plurality of pairs as well, depending on the data width of the data bus. Advantageously, the individual feature vectors to be compared are therefore arranged successively in the data memory in the same sequence as their features. By cyclical addressing, for example, the same test feature vector is compared over and over again to different reference feature vectors, namely in exactly such a form that one respective test feature vector is always compared to exactly one reference feature vector in a method step.

The corresponding data word widths and the data bus widths are especially advantageously matched to one another in the inventive operating method, so that the test feature vector located in the test memory can also be addressed by cyclical addressing of the data memory with continuous, or successive, addresses in that only the least significant bit of the data memory address is supplied to it.

DETAILED DESCRIPTION OF THE PREFERRED EMBODIMENTS

Figure 1:
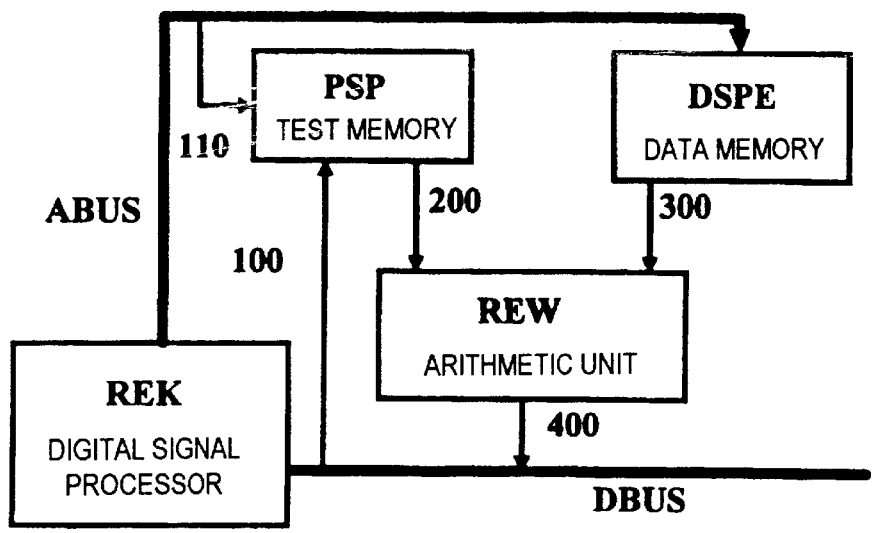
FIG. 1 is a block diagram which shows an example of an inventive signal processor arrangement.

FIG. 1 shows an example of an inventive digital signal processor arrangement. The computer core of the digital signal processor REK as well as the test memory PSP and the data memory DSPE together with the arithmetic unit REW are shown therein. A separate address bus ABUS and a separate data bus DBUS for the digital signal processor are provided in this example. During operation of the inventive signal processor arrangement, for example, a digitized voice signal is supplied to the computer core REK which calculates a feature vector from the voice signal—which is referred to here as a test feature vector—and deposits it in the test memory PSP of the digital signal processor arrangement via the data bus DBUS and the delivery line 100. For example, the reference feature vectors that represent speech features to be recognized are deposited in the data memory of the digital signal processor. These reference feature vectors are all to be subsequently compared to the test feature vector. To this end, for example, the computer core REK applies addresses to the data memory DSPE and to the test memory PSP via the address bus ABUS. The test memory PSP is usually smaller, since it need accept only one feature vector and therefore receives, for example, only a fraction of the address which is available on the address bus ABUS via the delivery line 110. To this end, the address must be of such a nature that it is adequate in terms of the address word width in order to be able to successively address all features of the test feature vector that is deposited in the test memory. Correspondingly larger addresses for addressing all features are required for the data memory DSPE that preferably contains the entire phoneme set to be recognized in the form of feature vectors. The present invention preferably provides that the feature vectors in the test memory and in the data memory PSP and DSPE comprise the same number of features. These features are preferably arranged in the same sequence in the test memory PSP according to successive memory addresses. It is noted that all feature vectors must be successively deposited in the data memory DSPE, preferably always in the same sequence as their features.

Feature by feature, or feature by feature in pairs, as well for features in the test memory PSP and corresponding features in the data memory DSPE can be addressed by cyclical addressing of the test memory PSP that, for example, receives only the least significant bits of the address bus. For example, these features are transparently transmitted for the digital signal processor from the test memory and data memory PSP and DSPE to the arithmetic unit REW via the respective lines 200 and 300 by generating an address at the address bus ABUS. A separate processor element is then present in the arithmetic unit REW per feature for the required calculating operations, for example for calculating the city block spacing. The broader the data bus DBUS of the digital signal processor and the shorter the features are with reference to this data bus, the more features can be simultaneously compared in the arithmetic unit REW per addressing event. The amount of the difference of two corresponding features is preferably formed by the arithmetic unit REW, for example with a separate processor for the respective feature, and this amount of the difference is added to the value of the simultaneously executed calculations. This result is subsequently made available at the data bus via the transmission line 400. For example, the computer core contains a counter or a program instruction that allows it to generate as many addresses via the ABUS as needed until one feature vector has been addressed and the intermediate results per addressing event have been added up at the data bus DBUS, in order to thus obtain the city block spacing for a feature vector to be compared after the execution of the entire addressing event for this feature vector.

A considerable acceleration of the calculations is achieved by the invention without requiring off-chip relocation of the calculation. At the same time, the problem of the selective readout of individual bytes of the memory words is implicitly solved. The solution is also transparent for the computer core REK since it merely generates addresses and already has, for example, intermediate results made available to it at the data bus DBUS via the line 400. It thus appears to the computer core as though an intermediate result had already been read out of the data memory DSPE via the generated address.

The invention is based on the idea that dedicated hardware is inserted between the data memory DSPE and the computer core REK. This hardware is composed of an additional memory unit PSP that, for example, comprises the size k/n words. The reference character k is the number of bytes in the feature vector and n is the number of bytes of the memory word. The features calculated for a signal section are stored in this test memory PSP. Further, this additional hardware comprises a parallel circuit of n arithmetic units in the arithmetic unit REW that, for example, each respectively calculate a difference amount between an element of the test feature vector and a corresponding element of a reference feature vector. Further, an addition logic means that adds up the difference amounts that are calculated in parallel is preferably provided therein. The test memory, for example, is organized such that the feature elements can be addressed with the least significant bits of an address for the data memory. Two data words are thus simultaneously addressed by the computer core with one address, specifically:

a word from the test memory composed of n features, a word in the data memory composed of n corresponding elements of a reference feature vector.

A sum of n difference amounts is added therefrom in the n arithmetic units with a following addition unit that were previously referred to as separate processors. The accumulation of the sums calculated in this way can be implemented, for example, in the computer core of the digital processor arrangement.

To this end, for example, REK implements the instruction "ADD (memory word, accumulator)". Instead of the memory word, however, an intermediate result calculated in the auxiliary hardware appears on the data bus DBUS—completely transparently for the computer core REK. An appropriate pipelining of the auxiliary hardware can preferably be implemented in order to thus avoid wait state cycles insofar as possible. A number of latency cycles caused by the pipelining merely arise, but these have no influence on the data throughput.

In the proposed solution, the number of system clock cycles required for a basic operation $D=D+|a-b|$ amounts to $1/n$. An acceleration factor of at least 10 is thus already achieved for $n=2$. The silicon area required for the auxiliary hardware is thereby minimal. The efficiency of the implementation expressed in computer throughput per unit of silicon area is consequently increased by nearly the same factor.

Figure 2:
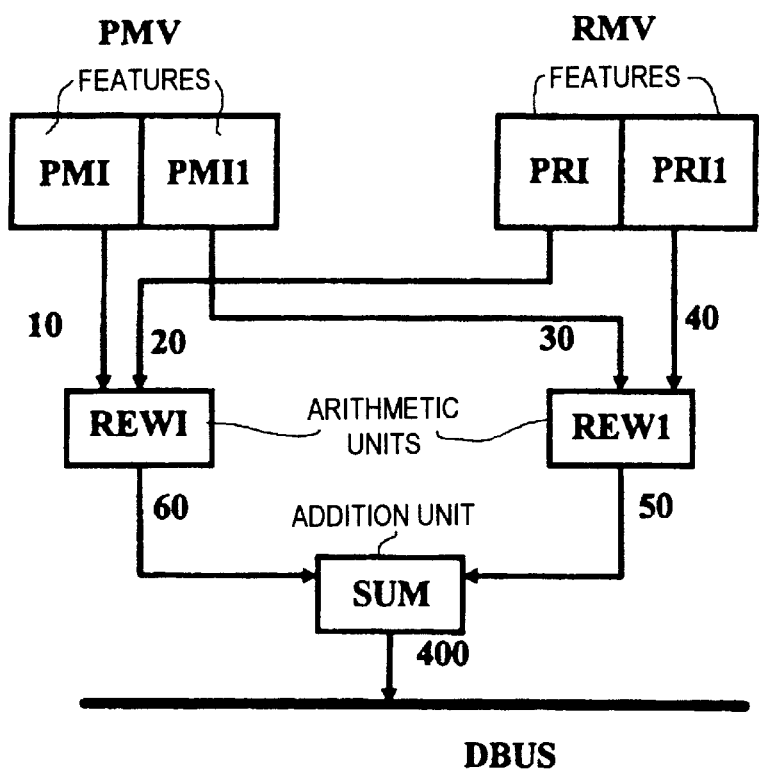
FIG. 2 is a block diagram which shows an example for the comparison of two features.

FIG. 2 illustrates an example for the multiple comparison of features within the arithmetic unit REW from FIG. 1. It is assumed in this example that the data busses are 16 bits wide and that a memory word is also 16 bits wide. The features in the individual feature vectors should have been described in one byte here, i.e. 8 bits. As already set forth above, corresponding features of the test feature vector are compared to corresponding features of a respective reference feature vector for forming the city block spacing. Two features, PMI and PMI1, of a test feature vector PMV are shown here. Let the corresponding features of the reference feature vector RMV be PRI and PRI1. As already explained in FIG. 1, the test feature vector is deposited in the test memory PSP in the sequence of all of its features. The reference feature vector that is utilized here for the comparison resides at an arbitrary location in the data memory DSPE.

In the addressing step of the present method, it must merely be assured by suitable precautions that corresponding features of the test feature vector are always compared to corresponding features of the reference feature vector. This means in particular that, for example, the reference feature vectors must be entered in the data memory DSPE which is seamlessly joined to one another and that, beginning with the first address, the first feature that corresponds with the first feature of the test feature vector must also be entered in the data memory. The sequence of the remaining reference feature vector and their individual features then derives in an analogous way. What can be achieved with specific embodiments of the present method that is dependent on the application parameters and that provides that, for example, only the least significant bits of the address for the data memory DSPE is supplied to the test memory is that the test feature vector is always through-addressed from the first to the last feature, whereas new, successive reference feature vectors are utilized over and over again for the comparison by the complete address.

The example recited here is not intended to mean that the invention is to be limited merely to words that are 16 bits wide. Words that are 32 or 64 bits wide or even words that are 8 bits wide or other widths can just as easily be utilized for future developments. It is immediately abundantly clear that the parallel processing is even more greatly accelerated the wider the memory word and the fewer the bits used by an individual feature of a feature vector. If the width of the data bus thereby does not correspond to a whole multiple of the number of bits in a feature, then it must be assured by a suitable address adapter that the correspondence of the individual features to be compared is preserved.

In FIG. 2, such corresponding features are the features PMI and PRI that are supplied together to an arithmetic unit REWI via the lines 10 and 20. REWI is a component part of the arithmetic unit REW from FIG. 1. For example, one such arithmetic unit is provided per feature to be compared. The corresponding features PMI1 and PRI1 are supplied to a further arithmetic unit REW1 via the lines 30 and 40. The calculations—amount formation and difference—that were already described in the description of FIG. 1 are implemented in the individual arithmetic units REWI and REW1. The results of the comparisons can be subsequently added up and then in turn be available at the data bus as, for example, a word that is maximally 16 bits wide. The summation event preferably occurs in the addition unit SUM. This is connected with lines 60 and 50. It preferably adds up the intermediate results from REW1 and REWI and makes the sum available at the data bus DBUS for further-processing via the line 400.

Let it be reemphasized that the invention is not intended to be limited to speech processing. The present invention may be applied to any other type of digital signal processing, for example image processing or other time-variant digital signals that must be compared to reference signals.

Although other modifications and changes may be suggested by those skilled in the art, it is the intention of the inventors to embody within the patent warranted hereon all changes and modifications as reasonably and properly come within the scope of their contribution to the art.

We claim:

1. A digital signal processor arrangement for comparing feature vectors, comprising:

a) at least one accumulator/multiplier-based signal processor computer core of a digital signal processor for calculating a test feature vector;

b) at least one data memory with a first data memory word width for accepting reference feature vectors;

c) at least one connection bus for the transmission of data and/or addresses at least between circuit elements of the arrangement, being fashioned such that a first data word width and a second address width can be transmitted;

d) at least one test memory with a second data memory word width for the acceptance of the test feature vector;

e) at least one calculating means for the comparison, said at least one calculating means comparing the test feature vector to exactly one reference feature vector per comparison event by forming the amount of the difference between corresponding features of the test feature vector and corresponding features of the reference feature vector and summing up the difference amount for the respective comparison event;

f) the data memory, the test memory and the calculating means are connected to the signal processor computer core via the connection bus, and the data memory as well as the test memory are connected to the calculating means.

2. A digital signal processor arrangement according to claim 1, wherein said at least one connection bus is a first connection bus, and further comprising:

a second connection bus comprising a second separate address bus and second separate data bus, said second separate address bus connecting said at least one data memory and said at least one test memory to said at least one accumulator/multiplier-based signal processor computer core, and said second separate data bus connecting said at least one test memory to said at least one accumulator/multiplier-based signal processor computer core and to said at least one calculating means.

3. A digital signal processor arrangement according to claim 1, wherein the first and the second data memory word width are the same.

4. A digital signal processor arrangement according to claim 1, wherein said at least one calculating means is connected to compare a feature comprising a size of a data memory word.

5. A digital signal processor arrangement according to claim 1, further comprising:

an address generator connected between said test memory and computer core, said address generator being connected to determine a test memory address from a data memory address adjacent at said at least one connection bus dependent on an arrangement of the reference feature vectors in said at least one data memory and dependent on an arrangement of the features of the test feature vector in said at least one test memory, determining said test address memory such that corresponding features are compared to one another.

6. A digital signal processor arrangement according to claim 1, wherein said at least one calculating means is connected to compare features of voice signals.

7. A method for operating a digital signal processor arrangement, comprising the steps of:

a) generating a single address with which at least one first feature of a test feature vector and a first, corresponding feature of a reference feature vector is addressed by a signal processor computer core of a digital signal processor;

b) simultaneously comparing the individual bits of the respective features;

c) making available a comparison result at a connection bus, so that it appears to the signal processor computer core as though it had called a data word stored in the data memory; and d) generating, dependent on a first and second data memory word width, so many new addresses until the features of the test feature vector and of the reference feature vector have been completely compared to one another, wherein, following thereupon, the address of a first feature of a further reference feature vector and of the first feature of the test feature vector is generated.

8. A method according to claim 7, further comprising the steps of:

a) selecting a first and the second data memory word width to be the same and corresponding to a whole multiple of the data word width of the connection bus;

b) the data memory word width being a whole multiple of the bit number of a feature;

c) successively depositing the features of the reference feature vectors in the data memory sorted according to successive addresses with identical sequence of their individual features;

d) depositing the test feature vector in a test memory sorted according to successive addresses with the same sequence of its individual features as in the reference feature vectors; and e) supplying only a number of least significant bits of a data memory address corresponding to the data memory word width to the test memory for addressing the features.

* * * * *